United States Patent
Itakura et al.

(10) Patent No.: US 11,958,459 B2
(45) Date of Patent: Apr. 16, 2024

(54) BRAKE SYSTEM

(71) Applicant: Hitachi Automotive Systems, Ltd., Hitachinaka (JP)

(72) Inventors: Kyoshiro Itakura, Tokyo (JP); Toshiyuki Ajima, Tokyo (JP); Kenichiro Matsubara, Hitachinaka (JP); Daisuke Goto, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 671 days.

(21) Appl. No.: 17/055,515

(22) PCT Filed: Mar. 18, 2019

(86) PCT No.: PCT/JP2019/011082
§ 371 (c)(1),
(2) Date: Nov. 13, 2020

(87) PCT Pub. No.: WO2019/244426
PCT Pub. Date: Dec. 26, 2019

(65) Prior Publication Data
US 2021/0197777 A1    Jul. 1, 2021

(30) Foreign Application Priority Data
Jun. 18, 2018  (JP) .................................. 2018-115135

(51) Int. Cl.
*B60T 8/171*   (2006.01)
*B60T 1/06*    (2006.01)
(Continued)

(52) U.S. Cl.
CPC .............. *B60T 8/171* (2013.01); *B60T 1/065* (2013.01); *B60T 13/746* (2013.01); *B60T 17/221* (2013.01)

(58) Field of Classification Search
CPC ........ B60T 1/065; B60T 8/171; B60T 13/741; B60T 13/746; B60T 17/22; B60T 17/221;
(Continued)

(56) References Cited

U.S. PATENT DOCUMENTS 10,125,834 B2 *  11/2018  Masuda ................ F16D 55/226
2011/0246039 A1 *  10/2011  Takeda .................... F16D 65/18
                                                               701/70
(Continued)

FOREIGN PATENT DOCUMENTS

JP    2000-018294 A    1/2000
JP    2004-124950 A    4/2004
(Continued)

OTHER PUBLICATIONS

Extended European Search Report issued in European Patent Application No. 19822195.4 dated Feb. 7, 2022.
(Continued)

*Primary Examiner* — Robert A. Siconolfi
*Assistant Examiner* — San M Aung
(74) *Attorney, Agent, or Firm* — Foley & Lardner LLP

(57) ABSTRACT

An object of the present invention is to appropriately control a clearance amount by correcting an estimation error of a contact position caused by a delay time difference between output signals of sensors, and to establish both improvement of fuel efficiency due to prevention of drag of a brake pad during non-braking and reduction in response time during braking.

A brake system includes a brake disc, a brake pad, a piston, a drive mechanism, a position sensor that detects a position of the piston, a thrust sensor that detects a thrust by which the brake pad presses the brake disc, and a brake control unit that adjusts a braking force by controlling the drive mechanism. The brake control unit includes a contact position (Continued)

computation unit that computes a contact position at which the brake pad and the brake disc come in contact with each other based on output signals of the position sensor and the thrust sensor, a position error computation unit that computes a position error of the contact position based on a delay time difference between the output signals of the position sensor and the thrust sensor, and a contact position correction unit that corrects the contact position obtained by the contact position computation unit by using the position error.

8 Claims, 5 Drawing Sheets

(51) Int. Cl.
*B60T 13/74* (2006.01)
*B60T 17/22* (2006.01)

(58) Field of Classification Search
CPC .. B60T 2270/406; F16D 65/18; F16D 65/567; F16D 66/023; F16D 2066/003; F16D 2066/005; F16D 2066/006; F16D 2121/24; F16D 2125/36; F16D 2125/50
USPC ........................................................ 188/72.1
See application file for complete search history.

(56) References Cited

U.S. PATENT DOCUMENTS

| | | | |
|---|---|---|---|
| 2012/0193177 A1* | 8/2012 | Goto | ....................... F16D 65/18 188/161 |
| 2017/0234380 A1* | 8/2017 | Yasui | .................... F16D 63/006 188/72.1 |
| 2017/0291585 A1 | 10/2017 | Kobune et al. | |
| 2017/0321773 A1 | 11/2017 | Lee et al. | |

FOREIGN PATENT DOCUMENTS

| | | |
|---|---|---|
| JP | 2008-133922 A | 6/2008 |
| JP | 4316213 B2 | 8/2009 |
| JP | 2012-159134 A | 8/2012 |

OTHER PUBLICATIONS

International Search Report with English translation and Written Opinion issued in corresponding application No. PCT/JP2019/011082 dated May 21, 2019.
Foreign Office Action issued in corresponding CN Application No. 201980030913.9 dated Jun. 28, 2022 (12 pages).

\* cited by examiner

BRAKE SYSTEM

TECHNICAL FIELD

The present invention relates to a brake system mounted on a vehicle such as an automobile to brake rotation of wheels.

BACKGROUND ART

A brake system that gives a braking force to a wheel according to an amount that a driver steps on a brake pedal is mounted on a vehicle such as an automobile. In the related art, many brake systems are hydraulic systems, but electric systems are recently increasing.

In the brake system using the electric system, since it is possible to pull back a brake piston which is difficult with the hydraulic system, it is possible to perform clearance control in which a desired gap is formed between the brake pad and a brake disc, and it is possible to expect improvement of fuel efficiency due to reduction of drag of the brake pad. At this time, when only the fuel efficiency is simply improved, it is sufficient to increase the gap during non-braking. However, when there is an attempt to increase braking response when the brake pedal is stepped on, it is desirable that the gap during non-braking is as narrow as possible. From such a background, a technology of accurately grasping a contact position between the brake pad and the brake disc is important in optimizing the clearance control. Technologies related to this optimization of the clearance control include the technologies described in, for example, PTL 1 to PTL 3.

An "electric disc brake device" of PTL 1 includes a piston that moves linearly along an axis of a disc, a brake pad that is pressed by the piston and comes in contact with the disc, a thrust sensor that detects a piston thrust force received by the piston, and a piston detector that detects a piston position which is a piston displacement, and illustrates a configuration in which it is determined that the disc is pressed when a detection value of the thrust sensor at the time of moving the piston forward and the piston position at that time is set as a contact position of the brake pad and the disc.

In a "vehicle-mounted brake device" of PTL 2, a configuration in which a rate of change in an output of a pressure sensor is computed at the time of releasing a brake and a position at which the rate of change is equal to or less than a set threshold value is detected as a contact position is illustrated.

In a "brake device" of PTL 3, a configuration in which at the time of releasing a brake, a position at which a piston is returned to a brake release side by a predetermined amount from a piston position at a point in time when a piston thrust is equal to or less than a predetermined threshold value larger than zero is set as a contact position of a disc rotor and a brake pad is illustrated.

CITATION LIST

Patent Literature

PTL 1: JP 2008-133922 A
PTL 2: JP 2000-018294 A
PTL 3: JP 2004-124950 A

SUMMARY OF INVENTION

Technical Problem

In PTL 1, detection accuracy of the contact position can be improved by reducing a detection threshold value of the thrust sensor. However, in general, since the thrust sensor has characteristics that detection accuracy of the thrust value rapidly deteriorates near a thrust of 0, it is essential that the detection threshold value is greater than or equal to a predetermined value, and there is a lower limit to the detection threshold value in fact. As a result, since there is a limit to the detection accuracy of the contact position with the brake pad, it is conceivable that the drag of the brake pad during non-braking remains in the method of PTL 1.

Meanwhile, in PTL 2, the contact position is detected from the rate of change of the output value of the pressure sensor, and it is easier to capture the change at the time of increasing the thrust than PTL 1 which directly uses the output value of the thrust sensor. Accordingly, the contact position can be detected with high accuracy. However, when a differential value of the thrust sensor is used as in PTL 2, erroneous detection due to sensor noise is likely to occur, and there is a problem that reliability is low.

In PTL 3, the contact position is estimated by computing the amount of change in piston thrust with respect to the amount of change in piston position by using two measurement points at the time of releasing the brake, and the problem of PTL 1 and the problem of PTL 2 are avoided.

However, in PTL 3, since a delay time when filter processing, communication processing, or computation processing is performed on the output signals of the sensors is not taken into consideration, when there is the delay time difference between the output signals of the sensors, the computation processing is performed on the output signals detected at different timings in the microcomputer as a set of pieces of information. Thus, a position error inevitably occurs between the estimated contact position and the original contact position. As a result, when the clearance control is executed by trusting the estimated contact position, a clearance amount is too small, and thus, the drag of the brake pad is likely to occur during non-braking. Alternatively, the clearance amount is too large, and thus, responsiveness during braking is likely to deteriorate.

The present invention has been made in view of the above problems, and is to provide a brake system capable of appropriately controlling a clearance amount by correcting an estimation error of a contact position caused by a delay time difference between output signals of sensors and estimating an actual contact position of a brake pad and a brake disc with high accuracy and establishing both improvement of fuel efficiency due to prevention of drag of the brake pad during non-braking and reduction in response time during braking.

Solution to Problem

In order to solve the problems, a brake system according to the present invention includes a brake disc that rotates with a wheel, a brake pad that gives a braking force to the brake disc, a piston that drives the brake pad, a drive mechanism that gives a driving force to the piston, a position sensor that detects a position of the piston, a thrust sensor that detects a thrust by which the brake pad presses the brake disc, and a brake control unit that adjusts the braking force by controlling the drive mechanism. The brake control unit includes a contact position computation unit that computes a contact position at which the brake pad and the brake disc come in contact with each other based on output signals of the position sensor and the thrust sensor, a position error computation unit that computes a position error of the contact position based on a delay time difference between the output signals of the position sensor and the thrust sensor, and a contact position correction unit that corrects the contact position obtained by the contact position computation unit by using the position error.

Advantageous Effects of Invention

According to the present invention, since the estimation accuracy of the contact position of the brake pad is improved, the clearance between the brake pad and the brake disc can be maintained at a desired value, and the reduction of the drag during non-braking and the reduction in response time during braking can be realized.

DESCRIPTION OF EMBODIMENTS

Hereinafter, although embodiments of the present invention will be described in detail with reference to the drawings, the present invention is not limited to the following embodiments, and various modifications and applications can be made within a technical concept of the present invention.

First Embodiment

A brake system according to a first embodiment of the present invention will be described with reference to FIGS. 1 to 4.

Figure 1:
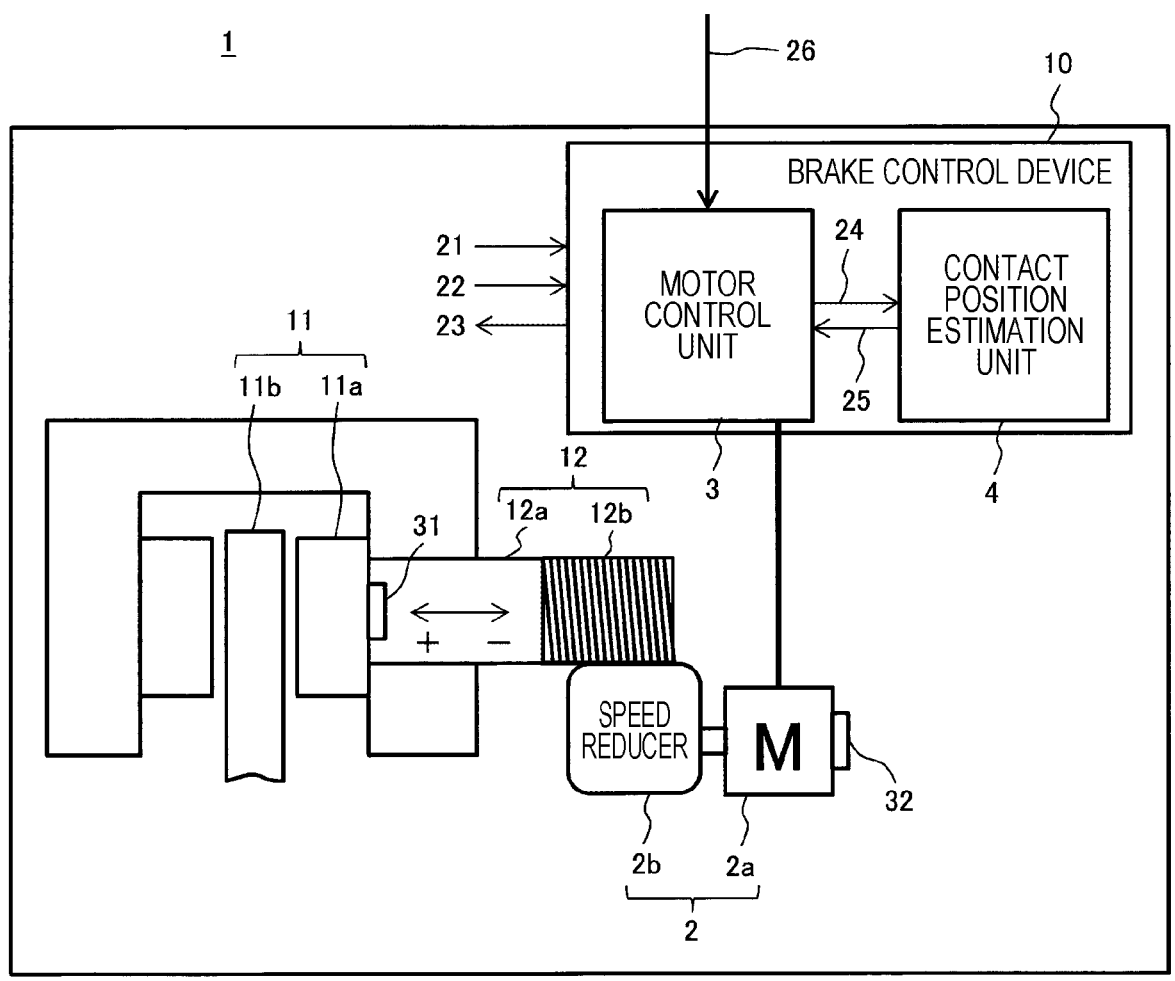
FIG. 1 is a schematic diagram of a brake system according to a first embodiment.

FIG. 1 is a schematic diagram of the brake system of the present embodiment, and illustrates a configuration corresponding to an electric brake for one wheel among a plurality of wheels included in a vehicle.

As illustrated in FIG. 1, a brake system 1 of the present embodiment roughly includes a drive mechanism 2, a brake control device 10, a braking mechanism 11, and a rotation and linear motion conversion mechanism 12. Among the components, the drive mechanism 2 includes an electric motor 2a and a speed reducer 2b, the brake control device 10 has a motor control unit 3 and a contact position estimation unit 4 built therein, the braking mechanism 11 includes a brake pad 11a and a brake disc 11b arranged so as to be approachable each other and detachable from each other, and the rotation and linear motion conversion mechanism 12 is a rod-shaped member including a piston 12a and a feed screw 12b.

In this brake system 1, a braking force is given to the brake disc 11b being rotated by reducing a rotational driving force generated by the electric motor 2a by the speed reducer 2b, converting the reduced rotational driving force into a linear driving force via the feed screw 12b, and pressing the brake pad 11a against the brake disc 11b by a linear motion of the piston 12a. Hereinafter, a direction in which the piston 12a approaches the brake disc 11b is a positive direction, and an opposite direction is a negative direction.

When the above-described braking operation is performed, the motor control unit 3 in the brake control device 10 controls the rotation of the electric motor 2a, and adjusts a pressing force of the brake pad 11a. The brake control device 10 estimates the braking force of the brake pad 11a based on a thrust detected by a thrust sensor 31 installed at the rotation and linear motion conversion mechanism 12. The brake control device 10 estimates a position of the brake pad 11a based on a rotational position detected by a position sensor 32 installed at the electric motor 2a. The position sensor 32 may be attached to the piston 12a such that the position of the piston 12a can be directly detected.

A control signal line 21, communication lines 22 and 23, and a main power line 26 are connected to the brake control device 10. The motor control unit 3 and the contact position estimation unit 4 built therein are connected to each other by the communication lines 24 and 25. Of these, the control signal line 21 is used to input a control command from a host control device such as an ECU to the brake control device 10, and the communication lines 22 and 23 are used to communicate information other than the control command with the host control device. Although the host control device and the brake control device 10 are separate devices, these devices may be integrated into an integrated control device.

Next, details of the contact position estimation unit 4 will be described with reference to FIG. 2. As illustrated in this diagram, the contact position estimation unit 4 includes a contact position computation unit 40, a delay time difference retainment unit 41, a position error computation unit 42, an apply and release determination unit 43, and a contact position correction unit 44. The contact position estimation unit receives a signal from the motor control unit 3 via the communication line 24, and outputs the signal to the motor control unit 3 via the communication line 25. The actual contact position estimation unit 4 includes a CPU, a computing device such as a microcomputer, a main storage device such as a semiconductor memory, an auxiliary storage device such as a hard disk, and hardware such as a communication device, and realizes functions illustrated in FIG. 2 by causing the computing device to execute a program stored in the main storage device while referring to data recorded in the auxiliary storage device or the like. Hereinafter, known operations of the contact position estimation unit will be appropriately omitted, and the details thereof unit will be described.

<Contact Position Computation Unit 40>

The contact position computation unit 40 moves the piston 12a to the brake disc 11b side, and a position of the piston 12a when the brake pad 11a and the brake disc 11b come into contact with each other and a gap therebetween becomes zero, that is, an origin position of the piston 12a is obtained by computation. p There are various methods for computing the origin position of the piston 12a. However, for example, a case where the same computation method as that of PTL 3 is adopted will be described. In this case, in the contact position computation unit 40, a relationship between the thrust of the brake pad 11a and the position of the piston 12a is plotted in a two-dimensional space based on detection signals of the thrust sensor 31 and the position sensor 32 which are input moment by moment at a predetermined sampling cycle, and the origin position of the piston 12a is computed based on a rate of change of any two points on an obtained curve (for example, two points corresponding to predetermined threshold values $T_{high}$ and $T_{low}$ in consideration of performance of the thrust sensor 31) (see FIG. 4 to be described later). The calculated origin position (hereinafter, referred to as a "contact position computation value $X_1$") is transmitted to the contact position correction unit 44 to be described later.

Since a delay time difference Δt between output signals of the sensors is not taken into consideration in the computation, the origin position which is the computation result deviates from the actual origin position. Thus, even though the origin position obtained by the computation is used as it is, appropriate clearance control aimed at by the present invention cannot be realized.

<Delay Time Difference Retainment Unit 41>

The delay time difference retainment unit 41 outputs the delay time difference Δt between the output signals of the thrust sensor 31 and the position sensor 32 which is generated by performing filter processing, communication processing, or computation processing. This delay time difference is a constant determined by the specifications of the sensors, and delay times of the thrust sensor 31 and the position sensor 32 may be stored individually, and the delay time difference Δt obtained by computation may be output, or the delay time difference Δt stored in advance may be output as it is. The delay time difference Δt output in this manner is transmitted to the position error computation unit 42.

Since the delay time difference retainment unit 41 is only required to be able to output a relative delay time difference Δt between the thrust sensor 31 and the position sensor 32, it is not always necessary to retain delay time information of both the sensors as constants in advance. Alternatively, the delay time difference Δt of the thrust sensor which is observed when the piston 12a executes any operation may be learned and output.

<Position Error Computation Unit 42>

The position error computation unit 42 computes a position error ΔXerr of the piston 12a caused by the delay time difference Δt by using the delay time difference Δt output by the delay time difference retainment unit 41 and a speed of the piston 12a obtained by performing time differentiation or the like on the output signal of the position sensor 32. The calculated position error ΔXerr is transmitted to the contact position correction unit 44 to be described later.

For example, the position error ΔXerr caused by the delay time difference Δt between both the sensors is calculated by multiplying the delay time difference Δt between both the sensors and the piston speed at a point in time when the detection signal of the thrust sensor 31 exceeds a predetermined threshold value (at a point in time when the brake pad 11a and the brake disc 11b are considered to have come into contact). It is assumed that the calculated piston speed is substantially equal to the piston speed at the time of contact, and it is desirable that the aforementioned threshold value is as small as possible to satisfy accuracy of the thrust sensor 31.

<Apply and Release Determination Unit 43>

The apply and release determination unit 43 determines whether an operation at the time of contact position estimation is an apply (increase) operation or a release (decrease) operation. For example, it is determined to be the apply operation when a thrust command value is increased compared to the previous command value, and conversely, it is determined to be the release operation when the thrust command value is decreased. The determination result of the apply and release determination unit 43 is transmitted to the contact position correction unit 44 as operation information.

<Contact Position Correction Unit 44>

The contact position correction unit 44 corrects an estimation error caused by the delay time difference Δt between the sensors by using the contact position computation value $X_1$ from the contact position computation unit 40, the position error ΔXerr from the position error computation unit 42, and the operation information from the apply and release determination unit 43, and outputs a contact position correction value $X_2$. For example, it is possible to output more accurate contact position correction value $X_2$ in consideration of the position error ΔXerr caused by the delay time difference Δt between the sensor signals in any operation by subtracting the position error ΔXerr from the contact position computation value $X_1$ in the apply operation and by adding the position error ΔXerr to the contact position computation value $X_1$ in the release operation. The contact position correction value $X_2$ corrected by the contact position correction unit 44 is transmitted to the motor control unit 3 via the communication line 25, and thereafter, the motor control unit 3 executes desired clearance control by regarding the contact position correction value $X_2$ as the origin position at which the brake pad 11a and the brake disc 11b come in contact with each other.

Figure 2:
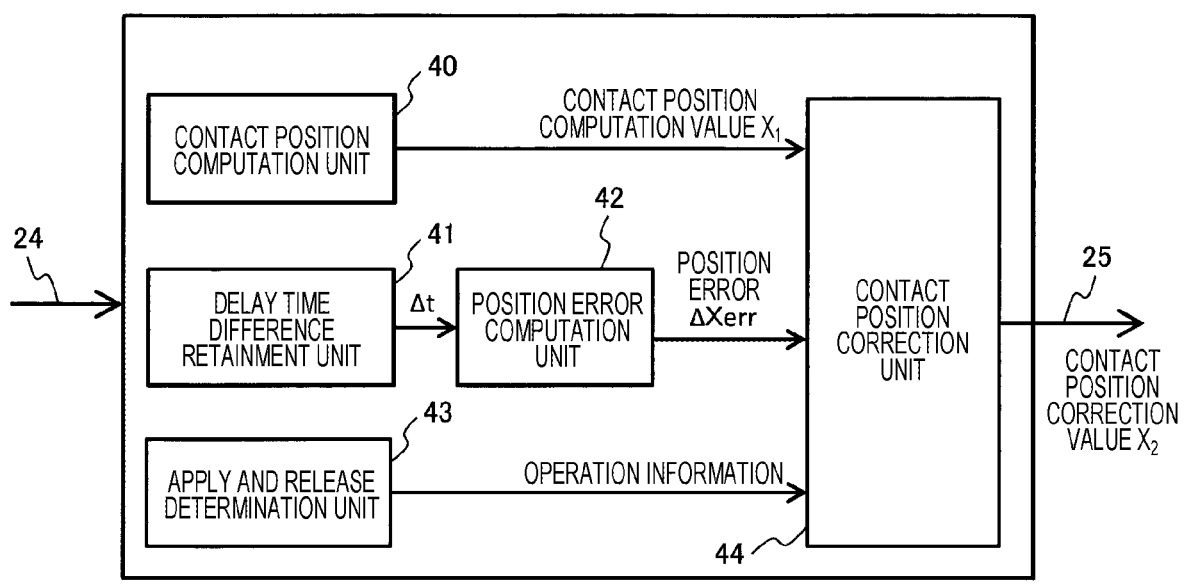
FIG. 2 is a functional block diagram of a contact position estimation unit according to the first embodiment.

Functional blocks of the contact position estimation unit 4 illustrated in FIG. 2 are actually executed by software stored in a memory of a microcomputer. Next, this computation flow will be described with reference to FIG. 3.

<<Step S10>>

In step S10, it is determined whether or not the vehicle is currently in a braking state. This determination can be performed based on whether a driver steps on a brake pedal by a predetermined amount or more and the thrust command value is equal to or greater than zero. When it is determined to be a non-braking state, since the processing of the contact position estimation cannot be executed, the processing is ended, and waits for the next start timing. Meanwhile, when it is determined to be the braking state, the processing proceeds to the next step S11.

<<Step S11>>

In step S11, the thrust of the brake pad 11a is detected from the output of the thrust sensor 31 installed at the rotation and linear motion conversion mechanism 12. A motor rotation position is detected from the output of the position sensor 32 installed at the electric motor 2a, and a motor rotation speed is detected by the time differentiation thereof.

<<Step S12>>

In step S12, the obtained motor rotation position is converted into a linear motion direction according to a ratio of rotational linear motion as in (Equation 1). The motor speed is similarly converted into a speed of the piston in the linear motion direction.

$$Xp = \theta \times (L/\varepsilon) \text{ [mm]} \qquad \text{(Equation 1)}$$

Xp is a piston position [mm], θ is a motor rotation position [rev], L is a lead of the feed screw 12b [mm/rev], and ε is a reduction ratio of the speed reducer 2b.

Here, these pieces of information are stored in a temporary storage area of a RAM provided in the microcomputer, and are used for the computation executed in the following control steps. It is also possible to detect other information other than these pieces of information in accordance with the brake system 1.

<<Step S13>>

Step S13 mainly corresponds to the processing in the contact position computation unit 40, and the origin position (contact position computation value $X_1$) of the piston 12a when the brake pad 11a and the brake disc 11b comes in contact with each other is computed. As described above, there are various methods of computing the origin position. For example, a piston position at which thrust values of any two points in the increase operation or the decrease operation and a thrust value from the amount of change in the piston position (tilt) become zero is determined as the contact position computation value $X_1$ based on the know-how of PTL 3 (see FIG. 4 to be described later). When the computation of the contact position computation value $X_1$ is completed, the processing proceeds to step S14.

<<Step S14>>

Step S14 mainly corresponds to the processing in the position error computation unit 42, the position error ΔXerr is calculated by (Equation 2) by using a representative piston speed Vp and the delay time difference Δt between the thrust sensor 31 and the position sensor 32 acquired from the delay time difference retainment unit 41.

$$\Delta Xerr = Vp \times \Delta t \quad \text{(Equation 2)}$$

Figure 3:
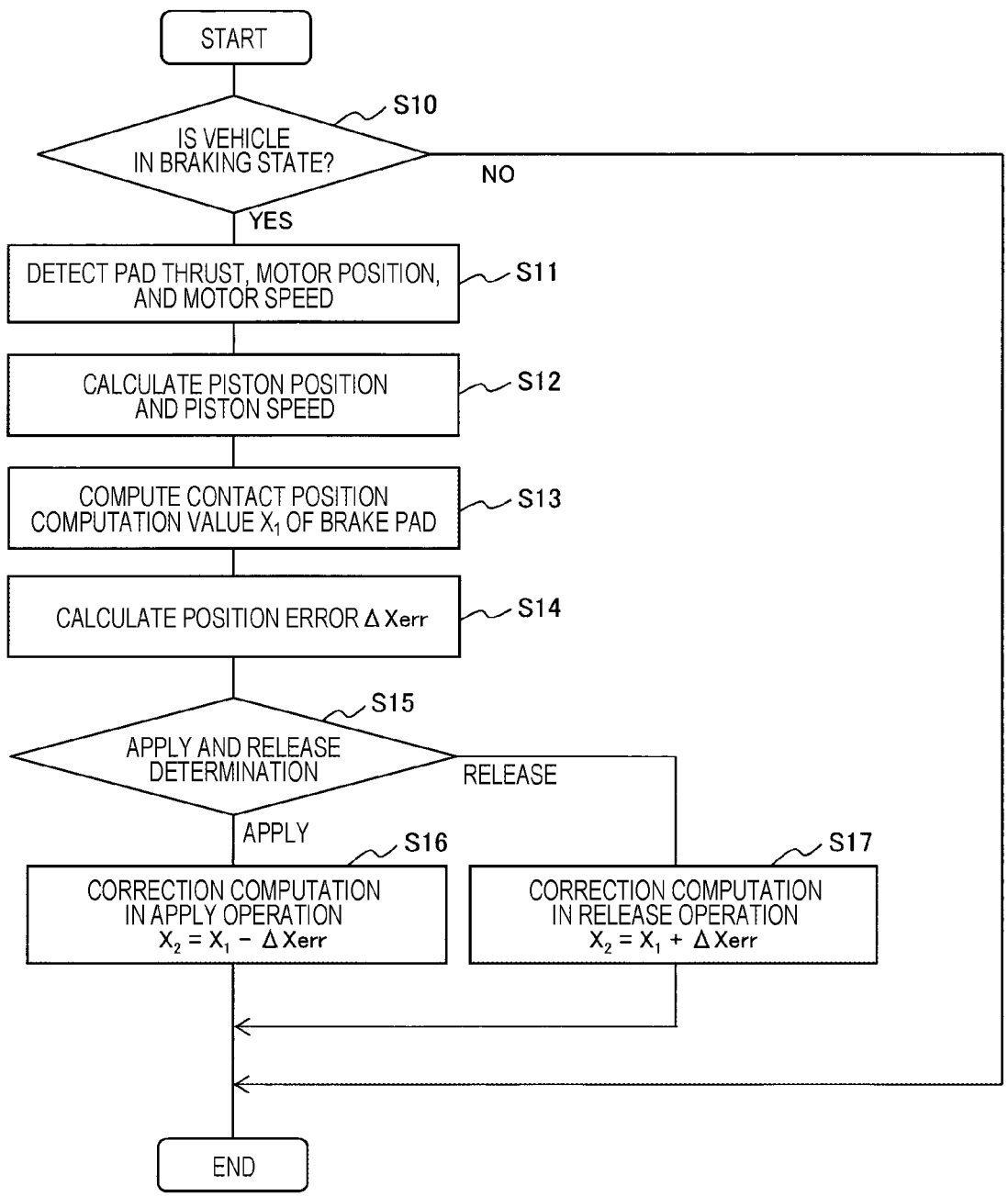
FIG. 3 is a flowchart illustrating a contact position estimation method according to the first embodiment.

Here, the representative piston speed Vp originally needs to be the speed at a point in time when the brake pad 11a comes in contact with, but it is not possible to know the piston speed at a true contact position before the completion of the contact position estimation in FIG. 3. Thus, as represented in (Equation 3), it is assumed that an average value of piston speeds (Vp1 and Vp2) at the two points used for the computation of the contact position computation value $X_1$ in step S13 is almost equal to the piston speed at the true contact position and is set as the representative piston speed Vp.

$$Vp = (Vp1 + Vp2)/2 \quad \text{(Equation 3)}$$

However, the speed when the thrust values at the two points handed in step S13 and the thrust value from the rate of change in the piston speed become zero may be estimated as the representative piston speed Vp, and the estimated speed may be used as the representative piston speed Vp. When the position error ΔXerr is calculated by (Equation 2) by using any representative piston speed Vp, the processing proceeds to step S15.

<<Step S15>>

Step S15 mainly corresponds to the processing in the apply and release determination unit 43, and it is determined whether the contact position computation value $X_1$ in step S13 is computed based on data acquired in an apply period or a release period. For example, it may be determined to be the apply operation when a thrust change rate ΔF at the two points handled in step S13 is positive, and it may be determined to be the release operation when thrust change rate is negative. Alternatively, it may be determined from the piston position or an increase or decrease of the thrust command. When the apply and release determination is completed, the processing proceeds to step S16 or step S17.

<<Step S16 and S17>>

When the determination result of step S15 is "apply", the processing proceeds to step S16, and the contact position correction value $X_2$ is obtained by subtracting the position error ΔXerr from the contact position computation value $X_1$. Meanwhile, when the determination result of step S15 is "release", the processing proceeds to step S17, and the contact position correction value $X_2$ is obtained by adding the position error ΔXerr to the contact position computation value $X_1$.

However, the aforementioned steps are performed when the thrust sensor 31 has a large delay with respect to the position sensor 32, and when the position sensor 32 has a large delay with respect to the thrust sensor 31, a sign is reversed. That is, when it is determined to the apply operation, the contact position correction value $X_2$ is obtained by adding the position error ΔXerr to the contact position computation value $X_1$, and when it is determined to be the release operation, the position error ΔXerr is subtracted from the contact position computation value $X_1$. By doing so, the contact position correction value $X_2$ is obtained.

Due to the execution of the above-described computation, when there is the delay time difference Δt between the thrust sensor 31 and the position sensor 32, the position error ΔXerr of the contact position estimation caused by the delay time difference is corrected, and the highly accurate contact position correction value $X_2$ is obtained. The obtained contact position correction value $X_2$ is used as the origin position of the piston 12a, and thus, it is possible to realize appropriate clearance control.

Next, a computation procedure illustrated in FIG. 3 will be described in detail with reference to FIG. 4. A horizontal axis is the position of the piston 12a, a vertical axis is the thrust of the brake pad 11a, and an intersection of two axes is the true piston position (origin position) which is the position of the piston 12a when the brake pad 11a and the brake disc 11b comes in contact with each other.

Figure 4:
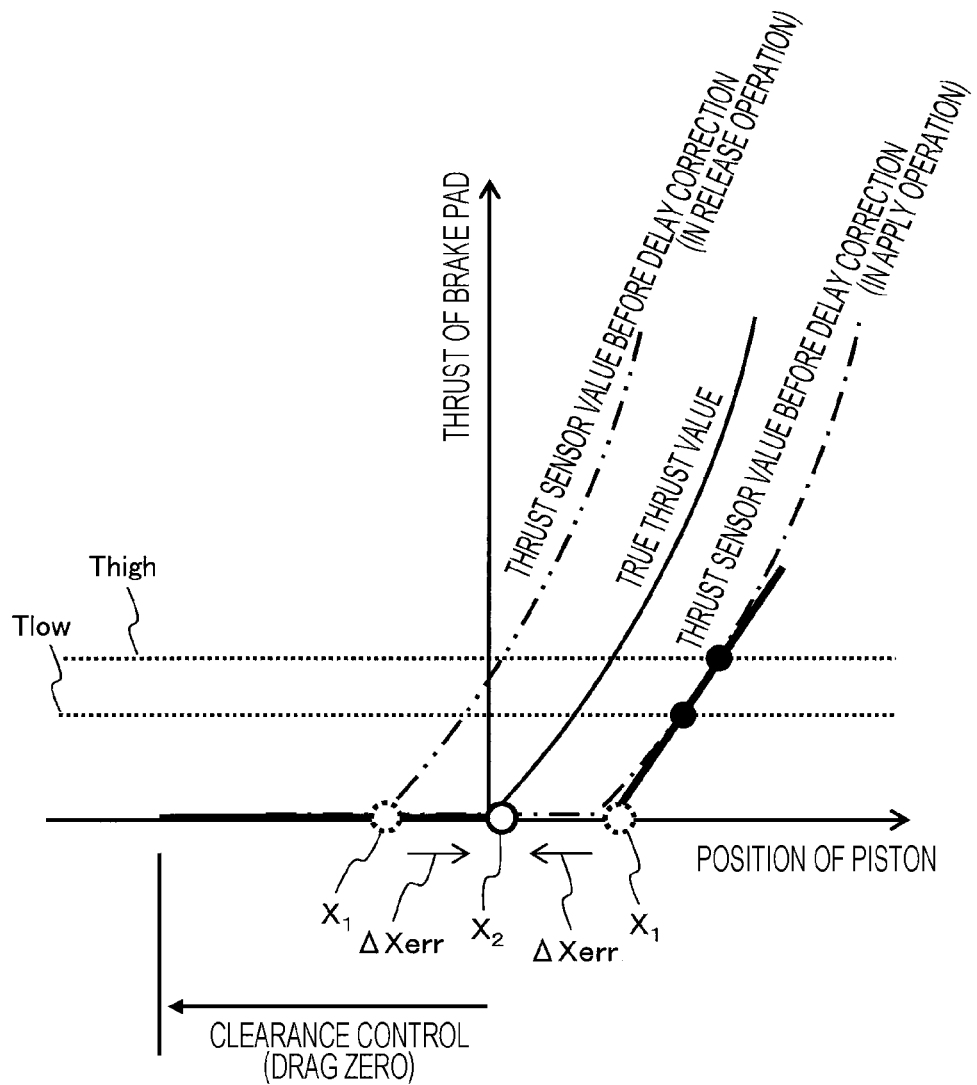
FIG. 4 is a conceptual diagram illustrating a correction operation of a contact position computation value according to the first embodiment.

In FIG. 4, a solid line curve represents a true relationship between the thrust of the brake pad 11a and the piston position. It can be seen that a relationship in which the thrust of the brake pad 11a is increased when the piston 12a moves in the positive direction (left direction in FIG. 1) and the thrust remains zero even though the piston moves in the negative direction (right direction in FIG. 1) is established.

A dashed dotted line curve represents thrust characteristics in the apply operation of a system in which the thrust sensor 31 has a delay with respect to the position sensor 32. In the apply (increase) operation, since an increase in the thrust detected by the thrust sensor 31 is delayed from an increase in the position detected by the position sensor 32, the contact position computation unit 40 recognizes the characteristics represented by the dashed dotted line. A dashed double-dotted line curve represents thrust characteristics in the release operation of a system in which the thrust sensor 31 has a delay with respect to the position sensor 32. In the release (decrease) operation, since a decrease in thrust detected by the thrust sensor 31 is delayed from a decrease in position detected by the position sensor 32, the contact position computation unit 40 recognizes the characteristics represented by the dashed double-dotted line.

Here, an example (corresponding to PTL 3) of the method of computing the contact position computation value $X_1$ in the contact position computation unit 40 will be described in detail by using the dashed dotted line curve corresponding to the apply operation as an example. First, an intersection (black circle in FIG. 4) with the dashed dotted line curve is obtained for each of the two threshold values $T_{high}$ and $T_{low}$ determined in consideration of the performance of the thrust sensor 31. Thereafter, a straight line (thick solid line) connecting these two points is obtained, and an intersection (white circle represented by a broken line) between this straight line and the horizontal axis is obtained. When the above-mentioned two threshold values are appropriately set, since the presence and absence of the thrust of the brake pad 11a are switched in the vicinity of this intersection (white circle represented by a broken line), the contact position computation unit 40 outputs, as the contact position computation value $X_1$ before correction, the intersection (white circle represented by a broken line).

Next, the contact position computation value $X_1$ is corrected by using the position error $\Delta X_{err}$ obtained by the position error computation unit 42. That is, the correction in consideration of the delay time difference $\Delta t$ between the sensors is performed for the characteristics in the apply operation represented by the dashed dotted line by subtracting the position error $\Delta X_{err}$ from the contact position computation value $X_1$ and for the characteristics in the release operation represented by the dashed double-dotted line by adding the position error $\Delta X_{err}$ to the contact position computation value $X_1$, and thus, the corrected contact position correction value $X_2$ (white circle represented by a solid line) closer to the true contact position than the contact position computation value $X_1$ can be obtained.

The position error $\Delta X_{err}$ is changed depending on the piston speed when the brake disc comes in contact with the brake pad 11a, and the position error $\Delta X_{err}$ is increased as the piston speed is increased. In the present embodiment, the representative piston speed Vp of (Equation 3) is used in the computation of the position error $\Delta X_{err}$, and the position error $\Delta X_{err}$ is increased when a contact speed is high, and the position error $\Delta X_{err}$ is decreased when the contact speed is low. That is, since the position error $\Delta X_{err}$ obtained by (Equation 2) takes into consideration the representative piston speed Vp, the contact position correction value $X_2$ (white circle by a solid line) close to the true contact position can be obtained regardless of the magnitude of the piston speed at the time of contact.

In the present embodiment, since the contact position computation value $X_1$ can be corrected to the contact position correction value $X_2$ closer to the true origin position by the aforementioned computation, the position control of the piston 12a is performed with this contact position correction value $X_2$ as a reference, and thus, it is possible to realize accurate clearance control higher than in the related art. Thus, according to the present embodiment, the drag of the brake pad 11a can be reduced during non-braking, and responsiveness during braking can be improved.

Second Embodiment

Next, a brake system according to a second embodiment of the present invention will be described with reference to a functional block diagram of FIG. 5. Redundant description will be omitted for the common points with the first embodiment.

Figure 5:
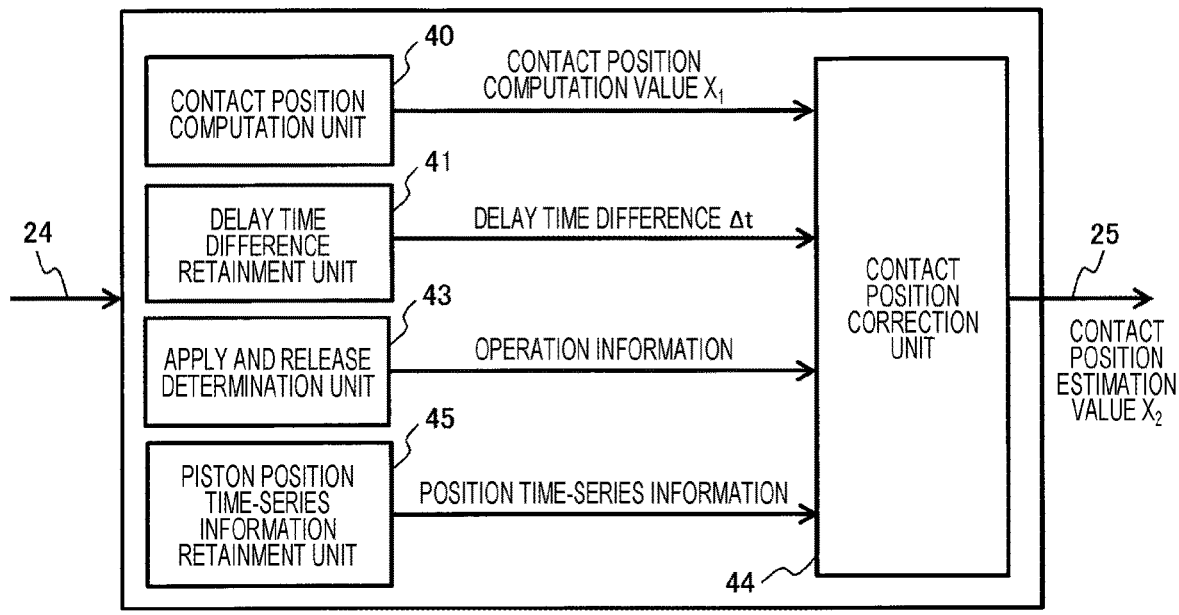
FIG. 5 is a functional block diagram of a contact position estimation unit according to a second embodiment.

The second embodiment includes a contact position estimation unit 4 for obtaining the contact position correction value $X_2$ by a method different from that of the first embodiment, and includes a piston position time-series information retainment unit 45 in addition to the contact position computation unit 40, the delay time difference retainment unit 41, the apply and release determination unit 43, and the contact position correction unit 44 which are the same as those in the first embodiment as illustrated in FIG. 5.

The piston position time-series information retainment unit 45 added in the present embodiment is used for recording a time-series change of the piston position in the apply operation or the release operation in a RAM region of the microcomputer, and obtains the contact position correction value $X_2$ close to the true origin position by reading, from the RAM, piston position information at a time returned from a time when the contact position computation value $X_1$ is computed by the contact position computation unit 40 by only the delay time difference $\Delta t$ between the sensors and correcting the contact position computation value $X_1$ by using the read piston position information.

According to the configuration of the present embodiment, the contact position correction value $X_2$ close to the true origin position can be obtained based on the actually recorded time-series data without computing the piston speed. As in the first embodiment, it is possible to reduce the drag of the brake pad 11a during non-braking by this contact position correction value $X_2$, and it is possible to improve the responsiveness during braking.

Third Embodiment

Next, a brake system according to a third embodiment of the present invention will be described with reference to a functional block diagram of FIG. 6. Redundant description will be omitted for the common points with the aforementioned embodiments.

Figure 6:
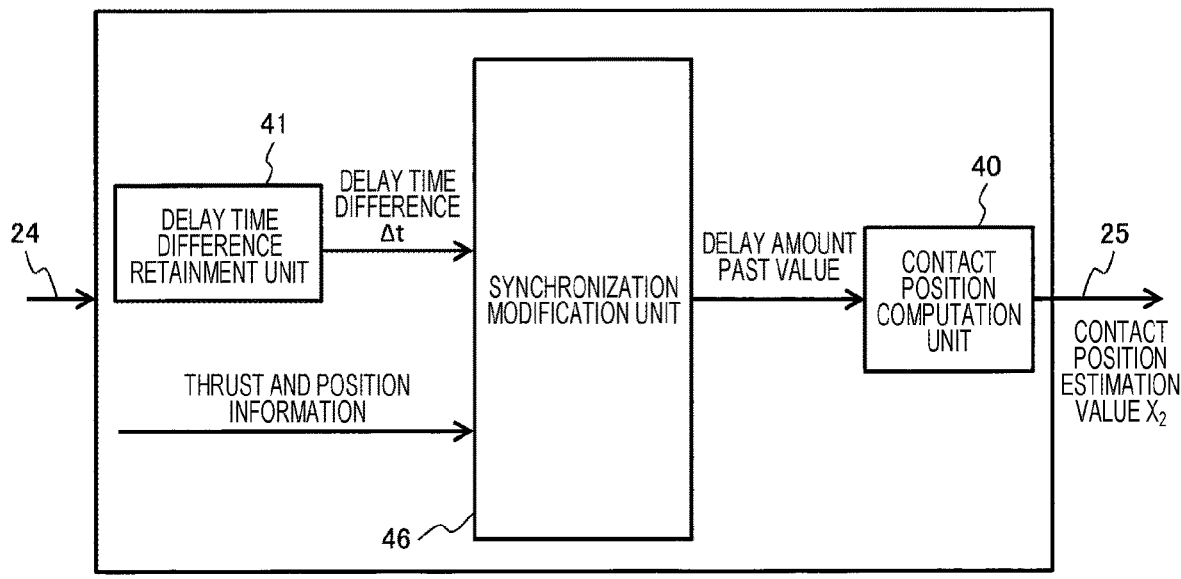
FIG. 6 is a functional block diagram of a contact position estimation unit according to a third embodiment.

The third embodiment includes a contact position estimation unit 4 for obtaining the contact position correction value $X_2$ by a method different from that of the first embodiment, and includes a synchronization modification unit 46 in addition to the contact position computation unit 40 and the delay time difference retainment unit 41 which are the same as those of the first embodiment as illustrated in FIG. 6.

The synchronization modification unit 46 of the present embodiment synchronizes the signals of the thrust sensor 31 and the position sensor 32 input via the communication line 24 based on the delay time difference $\Delta t$ input from the delay time difference retainment unit 41. For example, when the detection result of the thrust sensor is delayed from the detection result of the position sensor 32 by 1 [ms], a set of pieces of data obtained by associating the information of the position sensor 32 after 1 [ms] with the current value of the thrust sensor 31 is processed, and thus, it is possible to cancel influence of a time shift present between the output values of the sensors. The output values of the sensors are input to the contact position computation unit 40 as a set of pieces of data in which the time shift is corrected in this manner, and thus, the position correction value $X_2$ close to the true origin position of the piston 12a can be obtained as in in the above-described embodiment. Due to the use of this contact position correction value $X_2$, the drag of the brake pad 11a can be reduced during non-braking, and the responsiveness during braking can be improved as in the above-described embodiment.

REFERENCE SIGNS LIST 1 brake system,
2 drive mechanism,
2a electric motor,
2b speed reducer,
3 motor control unit,
4 contact position estimation unit,
10 brake control device,
11 braking mechanism,
11a brake pad,
11b brake disc,
12 rotation and linear motion conversion mechanism,
12a piston,
12b feed screw,
21 control signal line,
22 to 25 communication line,
26 main power line,
31 thrust sensor
32 position sensor, 40 contact position computation unit,
41 delay time difference retainment unit,
42 position error computation unit,
43 apply and release determination unit,
44 contact position correction unit,
45 piston position time-series information retainment unit,
46 synchronization modification unit,
$X_1$ contact position computation value,
$X_2$ contact position correction value

The invention claimed is:

1. A brake system, comprising:
a brake disc that rotates with a wheel;
a brake pad that gives a braking force to the brake disc;
a piston that drives the brake pad;
a drive mechanism that gives a driving force to the piston;
a position sensor that detects a position of the piston;
a thrust sensor that detects a thrust by which the brake pad presses the brake disc; and
a brake control unit that adjusts the braking force by controlling the drive mechanism, wherein
the brake control unit includes
a contact position computation unit that computes a contact position at which the brake pad and the brake disc come in contact with each other based on output signals of the position sensor and the thrust sensor,
a position error computation unit that computes a position error of the contact position based on a delay time difference between the output signals of the position sensor and the thrust sensor, and
a contact position correction unit that corrects the contact position obtained by the contact position computation unit by using the position error,
wherein the position error computation unit outputs the position error substantially proportionally to the delay time difference between the output signals of the position sensor and the thrust sensor.

2. The brake system according to claim 1, wherein the brake control unit further includes an apply and release determination unit that determines whether an operation corresponds to an apply operation of increasing the braking force or a release operation of decreasing the braking force based on any of a sign of the thrust, a sign of the position of the piston, and a sign of a speed of the piston.

3. The brake system according to claim 2, wherein when a signal delay of the thrust sensor is longer than the position sensor,
the contact position correction unit corrects the contact position by subtracting the position error from the contact position computed by the contact position computation unit in the apply operation, and
corrects the contact position by adding the position error to the contact position computed by the contact position computation unit in the release operation.

4. The brake system according to claim 2, wherein when a signal delay of the thrust sensor is shorter than the position sensor,
the contact position correction unit corrects the contact position by adding the position error to the contact position computed by the contact position computation unit in the apply operation, and
corrects the contact position by subtracting the position error from the contact position computed by the contact position computation unit in the release operation.

5. The brake system according to claim 1, wherein the position error computation unit outputs the position error substantially proportion to a speed of the piston when the brake pad and the brake disc come in contact with each other.

6. The brake system according to claim 1, wherein the delay time difference is a delay time difference determined by learning a time delay until the thrust starts to be changed when the position of the piston is changed.

7. A brake system, comprising:
a brake disc that rotates with a wheel;
a brake pad that gives a braking force to the brake disc;
a piston that drives the brake pad;
a drive mechanism that gives a driving force to the piston;
a position sensor that detects a position of the piston;
a thrust sensor that detects a thrust by which the brake pad presses the brake disc; and
a brake control unit that adjusts the braking force by controlling the drive mechanism, wherein
the brake control unit includes
a contact position computation unit that computes a contact position at which the brake pad and the brake disc come in contact with each other based on output signals of the position sensor and the thrust sensor,
a piston position time-series information retainment unit that retains positions of the piston in time series,
a contact position correction unit that sets, as the corrected contact position, the position of the piston at a time separated from a time corresponding to the contact position computed by the contact position computation unit by only the delay time difference between the output signals of the position sensor and the thrust sensor, and
a position error computation unit that computes a position error of the contact position based on a delay time difference between the output signals of the position sensor and the thrust sensor,
wherein the position error computation unit outputs the position error substantially proportionally to the delay time difference between the output signals of the position sensor and the thrust sensor.

8. A brake system, comprising:
a brake disc that rotates with a wheel;
a brake pad that gives a braking force to the brake disc;
a piston that drives the brake pad;
a drive mechanism that gives a driving force to the piston;
a position sensor that detects a position of the piston;
a thrust sensor that detects a thrust by which the brake pad presses the brake disc; and
a brake control unit that adjusts the braking force by controlling the drive mechanism, wherein
the brake control unit includes
a synchronization modification unit that modifies synchronization of the output signals of the position sensor and the thrust sensor based on a delay time difference between the output signals of the position sensor and the thrust sensor,
a contact position computation unit that computes a contact position at which the brake pad and the brake disc come in contact with each other based on the output signals of the position sensor and the thrust sensor of which the synchronization is corrected, and
a position error computation unit that computes a position error of the contact position based on a delay time difference between the output signals of the position sensor and the thrust sensor,
wherein the position error computation unit outputs the position error substantially proportionally to the delay time difference between the output signals of the position sensor and the thrust sensor.

* * * * *